United States Patent
Tamiya et al.

(10) Patent No.: US 9,519,415 B2
(45) Date of Patent: Dec. 13, 2016

(54) INFORMATION PROCESSING DEVICE, STORAGE MEDIUM, INFORMATION PROCESSING SYSTEM, AND INFORMATION PROCESSING METHOD

(71) Applicant: NINTENDO CO., LTD., Kyoto (JP)

(72) Inventors: Fumihiko Tamiya, Kyoto (JP); Jung Chan, Vancouver (CA); Randy Cavanagh, Vancouver (CA); Bjorn Nash, Vancouver (CA); Alex Macfarlane, Vancouver (CA); Brandon Gill, San Francisco (CA)

(73) Assignee: NINTENDO CO., LTD., Kyoto (JP)

( * ) Notice: Subject to any disclaimer, the term of this patent is extended or adjusted under 35 U.S.C. 154(b) by 207 days.

(21) Appl. No.: 14/074,385

(22) Filed: Nov. 7, 2013

(65) Prior Publication Data

US 2014/0143714 A1    May 22, 2014

(30) Foreign Application Priority Data

Nov. 16, 2012 (JP) ................................. 2012-252189

(51) Int. Cl.
*G06F 3/0485* (2013.01)
*G06F 3/0482* (2013.01)
*G06F 3/0481* (2013.01)

(52) U.S. Cl.
CPC ........... *G06F 3/0485* (2013.01); *G06F 3/0482* (2013.01); *G06F 3/0481* (2013.01); *G06F 3/04817* (2013.01)

(58) Field of Classification Search
CPC .... G06F 3/0416; G06F 3/0482; G06F 3/0481; G06F 3/0485; G06F 3/0488; G06F 3/04886
USPC .......... 715/702, 784, 810, 830; 345/173, 647
See application file for complete search history.

(56) References Cited

U.S. PATENT DOCUMENTS

| 2011/0107264 A1* | 5/2011 | Akella ........................ 715/830 |
| 2012/0066644 A1 | 3/2012 | Mizutani et al. |
| 2012/0086650 A1* | 4/2012 | Oiwa ................... G06F 3/0482 345/173 |

FOREIGN PATENT DOCUMENTS

JP      2012-63862      3/2012

* cited by examiner

*Primary Examiner* — Alvin Tan
*Assistant Examiner* — Rinna Yi
(74) *Attorney, Agent, or Firm* — Nixon & Vanderhye P.C.

(57) ABSTRACT

An exemplary information processing device includes: a scrolling unit configured to scroll an image group including plural images, in accordance with an input from a user; a display control unit configured to change how at least one image included in the image group is displayed, upon the image group reaching a predetermined end as a result of scrolling; and a propagating unit configured to propagate the change from one image included in the image group to another image included therein.

20 Claims, 14 Drawing Sheets

INFORMATION PROCESSING DEVICE, STORAGE MEDIUM, INFORMATION PROCESSING SYSTEM, AND INFORMATION PROCESSING METHOD

CROSS REFERENCE TO RELATED APPLICATION

The disclosure of Japanese Patent Application No. 2012-252189, filed on Nov. 16, 2012, is incorporated herein by reference.

FIELD

The present disclosure relates to a user interface.

BACKGROUND AND SUMMARY

User interfaces for scrolling an image are known.

The present disclosure provides a technique for allowing a scrolled image having reached an end of a display area to be recognized more instinctively.

There is provided an information processing device including: a scrolling unit configured to scroll an image group including plural images, in accordance with an input from a user; a display control unit configured to change how at least one image included in the image group is displayed, upon the image group reaching a predetermined end as a result of scrolling; and a propagating unit configured to propagate the change from one image included in the image group to another image included therein.

BRIEF DESCRIPTION OF THE DRAWINGS

Exemplary embodiments will be described with reference to the following drawings, wherein.

DETAILED DESCRIPTION OF NON-LIMITING EXEMPLARY EMBODIMENTS

1. Overview

Figure 1:
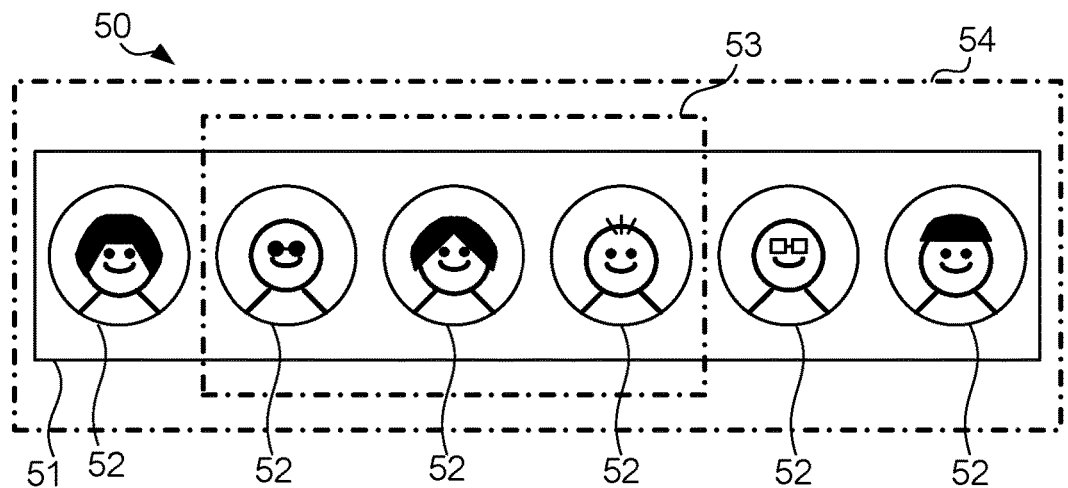
FIG. 1 shows non-limiting exemplary virtual space 50 in the present embodiment.

FIG. 1 shows non-limiting exemplary virtual space 50 in the present embodiment. Virtual space 50 is a two-dimensional virtual space. Virtual space 50 includes field 51 and objects 52. Field 51 is an area in which the objects are arranged in the virtual space. Objects 52 are virtual objects arranged within the virtual space, and include, for example, at least one of the objects representing a character (a person, an animal, a monster, etc.), a building (a house, a tower, a castle, etc.), a natural object (a mountain, a river, a tree, rock, etc.), a product that is not fixed in the field (a car, a block, etc.), an icon, a button, and the like. In the example in FIG. 1, plural objects 52 each indicating a character are arranged.

Virtual space 50 is provided with a virtual camera (not shown), and an image that is virtually captured by this virtual camera is displayed on a display device. Area 53 represents an area captured by the virtual camera, in other words, an area displayed on the display device. Area 53 moves in accordance with an operational input by a user. In other words, the image displayed on the display device scrolls in accordance with the operational input. Freely movable region 54 is set for area 53. Area 53 freely moves in accordance with an operation of the virtual camera as long as a predetermined reference point (e.g., the center or an end point of area 53, etc.) is located within freely movable region 54, but the reference point cannot go outside freely movable region 54, and its movement is restricted such that the reference point will not go beyond freely movable region 54.

Figure 2A:
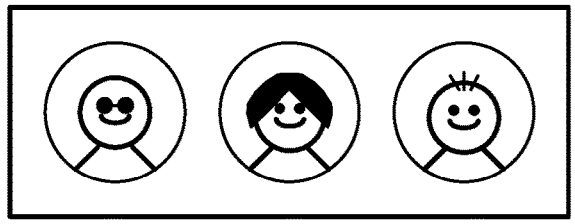
FIG. 2A shows a non-limiting exemplary image displayed on display unit 20 in a comparative example.
Figure 2B:
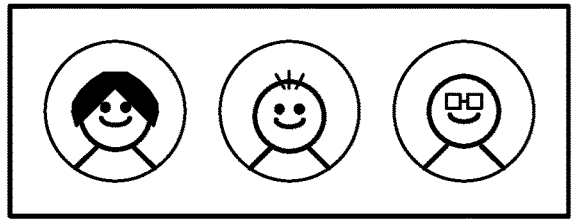
FIG. 2B shows a non-limiting exemplary image displayed on display unit 20 in a comparative example.
Figure 2C:
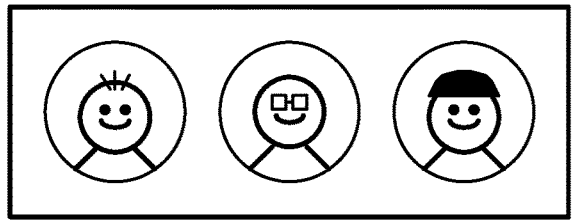
FIG. 2C shows a non-limiting exemplary image displayed on display unit 20 in a comparative example.
Figure 2D:
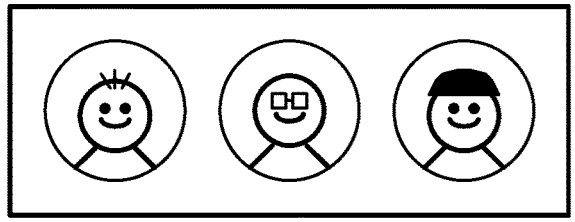
FIG. 2D shows a non-limiting exemplary image displayed on display unit 20 in a comparative example.

FIGS. 2A-2D each shows non-limiting exemplary image displayed on display unit 20 in a comparative example. Arrow V indicates a moving direction of area 53 (in other words, a moving direction of virtual camera). In the example described here, area 53 has a rightward moving velocity (i.e., the displayed image scrolls leftward). The moving velocity is provided in accordance with an operational input by a user. The displayed image successively changes as shown first in FIG. 2(a) to FIG. 2B, and then to FIG. 2C, in accordance with the operational input (e.g., a leftward drag operation). FIG. 2C shows a state where a right end of area 53 matches a right side of freely movable region 54, in other words, a state where the right end of area 53 has moved up to a right end of freely movable region 54. In the comparative example, even if area 53 has a (virtual or calculated) rightward moving velocity (e.g., even if an operational input for moving area 53 rightward is given), area 53 does not move rightward anymore (FIG. 2D). In this state, a user may not recognize whether area 53 does not scroll anymore because it has reached the end of freely movable region 54 or because a device failure has occurred and disabled scrolling.

Figure 3A:
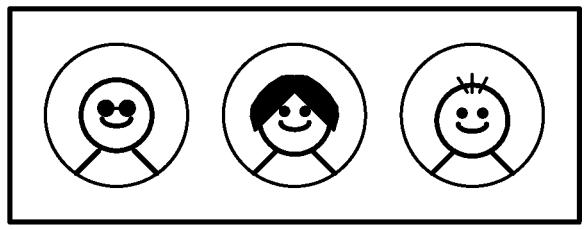
FIG. 3A shows a non-limiting exemplary image displayed on display unit 20 in the present embodiment.
Figure 3A:
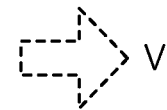
Figure 3B:
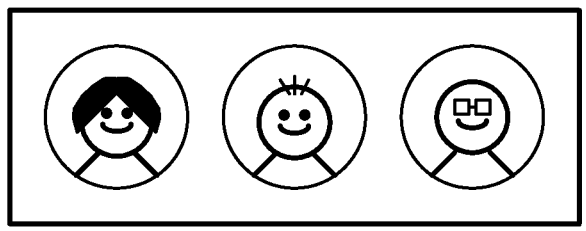
FIG. 3B shows a non-limiting exemplary image displayed on display unit 20 in the present embodiment.
Figure 3B:
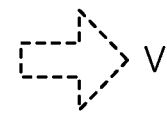
Figure 3C:
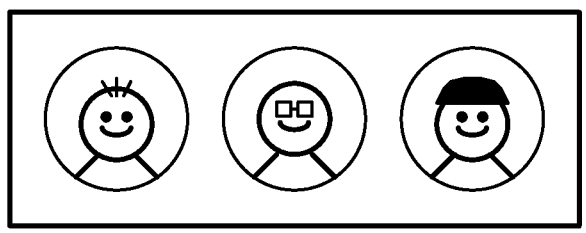
FIG. 3C shows a non-limiting exemplary image displayed on display unit 20 in the present embodiment.
Figure 3C:
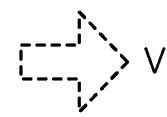
Figure 3D:
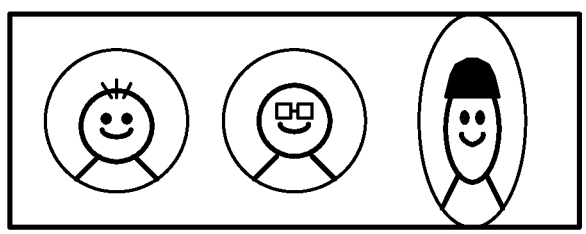
FIG. 3D shows a non-limiting exemplary image displayed on display unit 20 in the present embodiment.
Figure 3D:
Figure 3E:
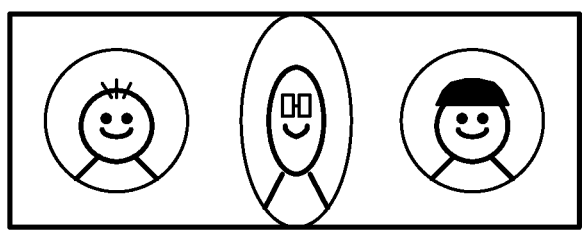
FIG. 3E shows a non-limiting exemplary image displayed on display unit 20 in the present embodiment.
Figure 3F:
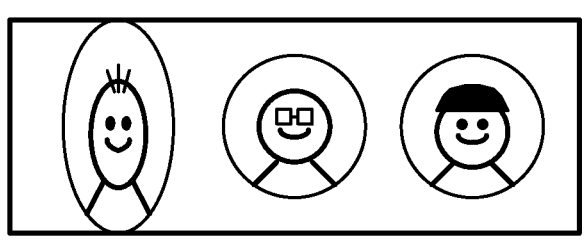
FIG. 3F shows a non-limiting exemplary image displayed on display unit 20 in the present embodiment.

FIGS. 3A-3F each shows a non-limiting exemplary image displayed on display unit 20 in the present embodiment. FIGS. 3A to 3C are the same as FIGS. 2A to 2C. If area 53 has a rightward moving velocity when in the state of FIG. 3C, in other words, when the reference point of area 53 has moved up to the right end of freely movable region 54, the appearance (or display mode, in this example, the shape and/or a displacement in the display position) of the virtual object at an end of area 53 changes (FIG. 3D). In other words, how the virtual object is displayed is changed. This sequential change of the appearance is propagated from the virtual object at the end of area 53 to inner virtual objects (FIGS. 3E and 3F). According to this example, the user can instinctively understand that area 53 has reached the end of freely movable region 54. A configuration and operation of a device for providing such a user interface will be described below.

2. Configuration

Figure 4:
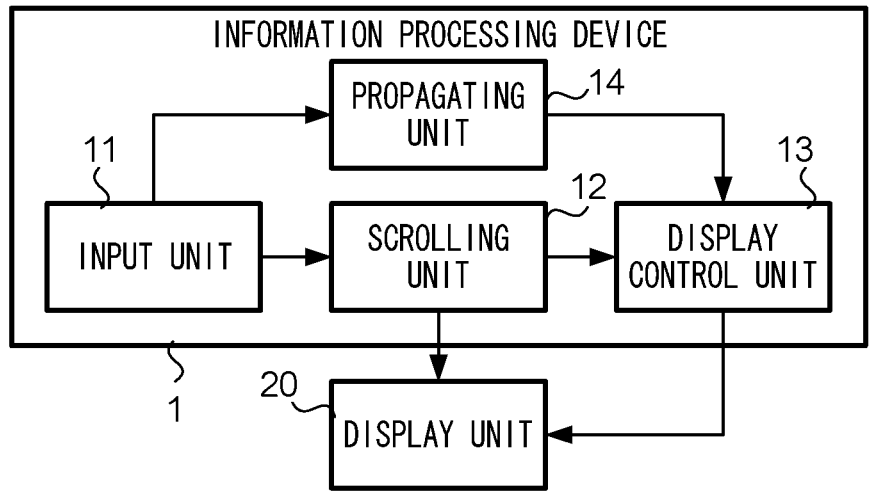
FIG. 4 shows a non-limiting exemplary functional configuration of information processing device 1.

FIG. 4 shows a non-limiting exemplary functional configuration of information processing device 1. Information processing device 1 includes input unit 11, scrolling unit 12, display control unit 13, and propagating unit 14. Input unit 11 receives the input of an instruction by the user. In this example, the instruction by the user is, in particular, an instruction to scroll. Scrolling unit 12 scrolls an image group including plural images, in accordance with the input instruction. The images are plural virtual objects. The image group is displayed on display unit 20. Display unit 20 in this example is a functional element provided by an external device that is separate from information processing device 1, and displays at least one of the characters and images. Display control unit 13 causes the image group to be scrolled in accordance with the instruction received by input unit 11. Upon the image group reaching an end of a predetermined area as a result of being scrolled, display control unit 13 changes the appearance for at least one of the images included in the image group. Propagating unit 14 propagates the change within the image group.

Figure 5:
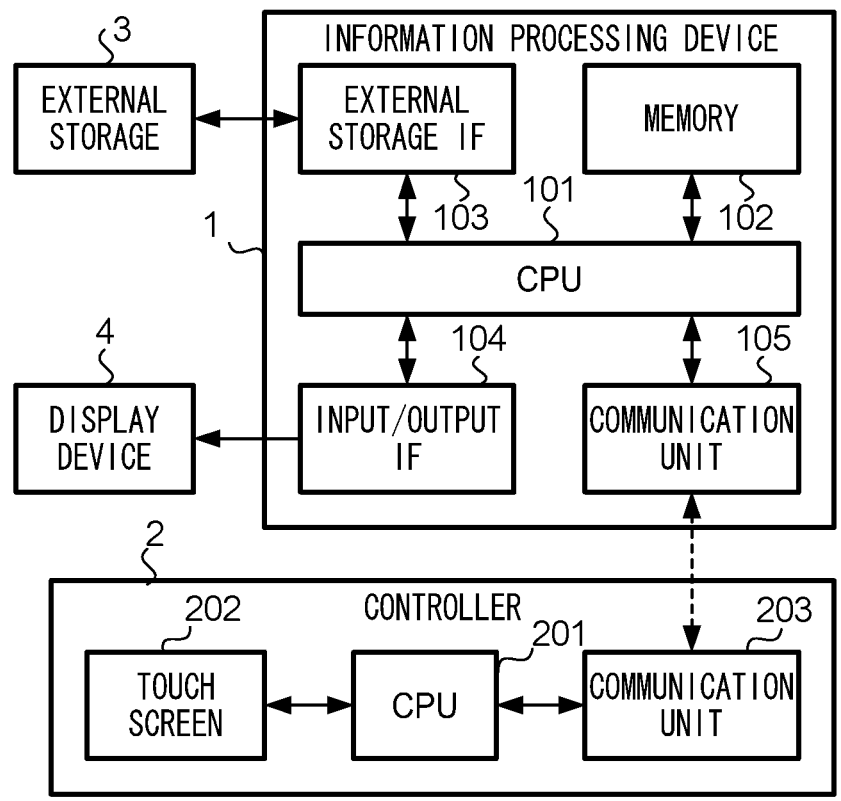
FIG. 5 shows a non-limiting exemplary hardware configuration of information processing device 1.

FIG. 5 shows a non-limiting exemplary hardware configuration of information processing device 1. In this example, information-processing device 1 is a gaming device for executing a video game. Information processing device 1 is a computer device including CPU 101, memory 102, external storage IF 103, input/output IF 104, and communication unit 105. Controller 2 is used to operate information processing device 1. Information processing device 1 is connected to display device 4. Display device 4 is a device for displaying information including at least one of the images and characters, and includes a display (a liquid-crystal panel, an organic EL (Electro-Luminescence) panel, etc.), and a drive circuit. In this example, information-processing device 1 is a so-called video game console, and does not include display device 4. Display device 4 is an external device, such as a television receiver. Note that information processing device 1 may include display device 4.

CPU 101 is a device for controlling each component of information processing device 1, and performs various operations. Memory 102 is a memory for storing a program and data, and includes a RAM (Random Access Memory) and a ROM (Read Only Memory), for example. External storage IF 103 is an interface for reading and writing a program and data from/to an external storage 3 (e.g., an optical disk, a magnetic disk, or a semiconductor memory) that stores the program (e.g., a game program) and data. Input/output IF 104 is an intermediary interface through which signals pass between information processing device 1 and an input/output device (in this example, display device 4). Communication unit 105 is a device for communicating with controller 2, and includes an antenna and an amplifier, for example. By executing a program (e.g., a game program) stored in external storage 3 or memory 102, the function (e.g., a video game) of this program is implemented in information processing device 1.

Controller 2 is a device for inputting an instruction to information processing device 1, and further has a function of displaying an image in accordance with a signal transmitted from information processing device 1, in this example. Controller 2 has CPU 201, touch screen 202, and communication unit 203. CPU 201 is a device for controlling each component of controller 2, and performs various operations using a memory (not shown). Touch screen 202 is a device having both a function of displaying information and a function of inputting an instruction, and includes a display, a drive circuit, and a touch sensor provided on the surface of the display, for example. Communication unit 203 is a device for communicating with information processing device 1, and includes an antenna and an amplifier, for example.

In this example, a function of displaying the image of area 53 in virtual space 50 on at least one of display device 4 and touch screen 202 under the program (a game program, system software, or a combination thereof) stored in external storage 3 or memory 102 is provided. Area 53 moves within virtual space 50 in accordance with an operational input given via controller 2. CPU 101 executing this program is an example of input unit 11, scrolling unit 12, display control unit 13, and propagating unit 14. At least one of display device 4 and touch screen 202 is an example of display unit 20.

3. Operation

Figure 6:
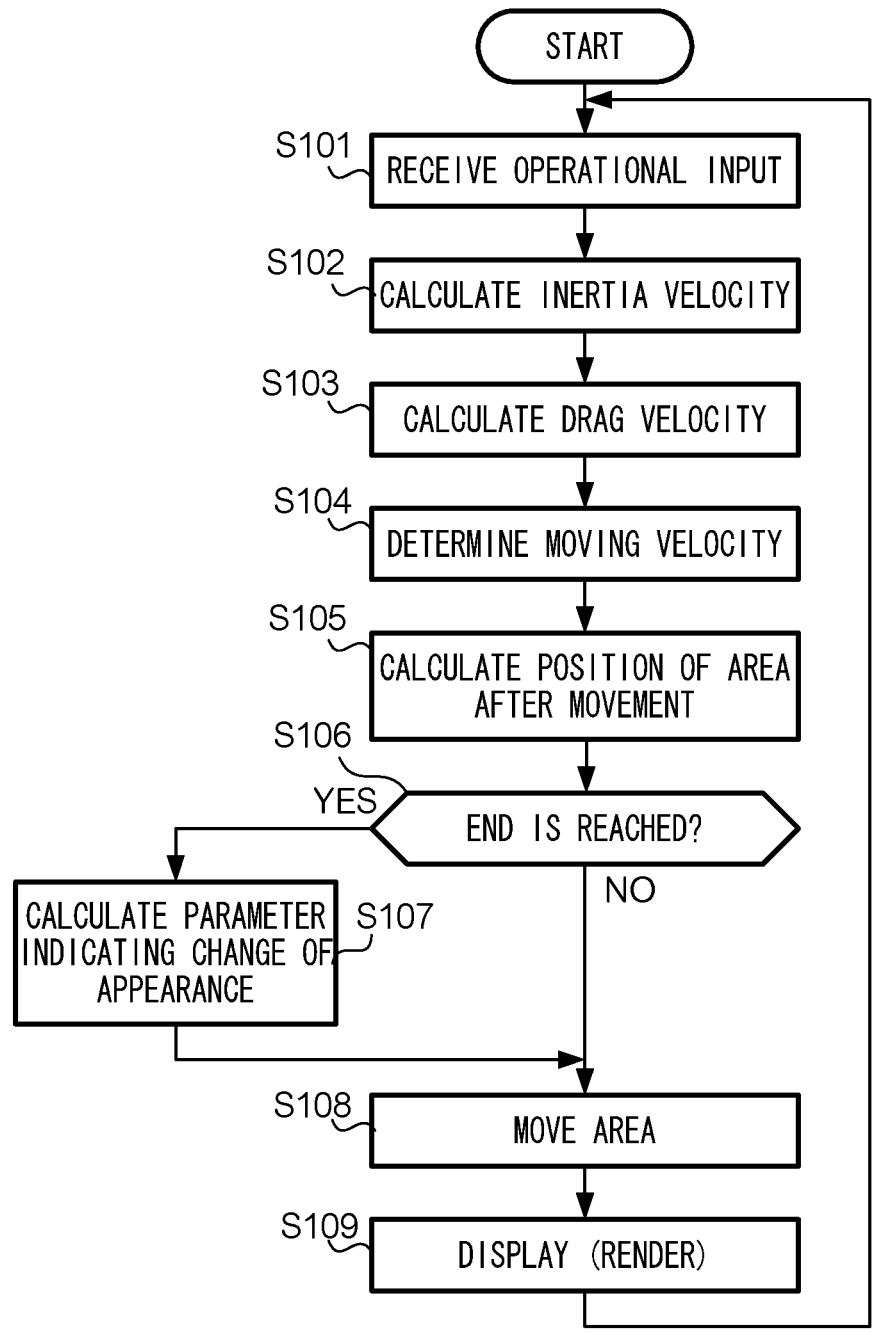
FIG. 6 is a non-limiting exemplary flowchart showing an operation of information processing device 1.

FIG. 6 is a non-limiting exemplary flowchart showing an operation of information processing device 1. A program for displaying the image of area 53 in virtual space 50 is executed before the start of the flow in FIG. 6. Here, a description will be given for an example in which the image of area 53 is displayed on touch screen 202, and an instruction according to an operational input to touch screen 202 by the user is input to information processing device 1. Also, processing in FIG. 6 in this example is repeatedly executed in a predetermined cycle (e.g., every 16.7 milliseconds, which corresponds to 60 Hz). This unit period for processing is called a "frame".

The operations on touch screen 202 include "drag" and "flick". "Drag" refers to an operation of tracing touch screen 202 with a finger or a stylus, in other words, an operation of moving a touch position while maintaining a touching state. "Flick" refers to an operation of quickly sweeping touch screen 202 with a finger or a stylus, in other words, an operation of dragging at a velocity faster than a predetermined reference value and then detaching the finger from touch screen 202. The moving velocity of area 53 is determined in accordance with these operations, and the image of area 53 moving in accordance with the determined moving velocity is displayed.

In step S101, CPU 101 receives an operational input. The details are as follows. A signal (hereinafter referred to as an "operational input signal") indicating an operational input by the user transmitted from controller 2 includes coordinates (hereinafter referred to as "real coordinates") of the position touched on touch screen 202. If touch screen 202 is not being touched during the current frame, the operational input signal includes a null value. CPU 101 converts the real coordinates into coordinates that indicate a position in virtual space 50 (hereinafter referred to as "virtual coordinates", and a point indicated by the virtual coordinates will be referred to as a "virtual point"). Memory 102 stores the virtual coordinates in each frame during a predetermined past period of time (e.g., from a frame in which drag or flick that is being performed was started to the latest frame, or during a predetermined number of frames), in order. CPU 101 writes the virtual coordinates in this frame (current frame) onto memory 102.

The moving velocity of area 53 is calculated using multiple sets of virtual coordinates stored in memory 102. In this example, there are two types of the moving velocity of area 53, namely an inertia velocity and a drag velocity. The inertia velocity and the drag velocity are calculated using different algorithms (or formulas). The inertia velocity is, for example, a velocity calculated in accordance with accumulation of operational inputs (i.e., multiple sets of virtual coordinates stored in memory 102). The drag velocity is, for example, a velocity according to the velocity of an operational input (drag).

In step S102, CPU 101 calculates the inertia velocity. CPU 101 stores the calculated inertia velocity in memory 102. In step S103, CPU 101 calculates the drag velocity. CPU 101 stores the calculated drag velocity in memory 102. In step S104, CPU 101 determines the moving velocity. In this example, CPU 101 determines the moving velocity in accordance with the operational input. Specifically, CPU 101 employs, as the moving velocity of area 53, the drag velocity if touch screen 202 is being touched during the current frame (i.e., if drag is being continued), and employs the inertia velocity if touch screen 202 is not being touched during the current frame.

In step S105, CPU 101 calculates the position of area 53 after the movement (more accurately, a candidate position thereof after the movement). For the calculation of the position after the movement, the current position and the moving velocity of area 53, and a frame cycle are used. The position of area 53 is indicated by the position of the reference point.

In step S106, CPU 101 determines whether or not the position of area 53 after the movement is in a state of having reached an end of freely movable region 54. The state of having reached the end includes a state of only having reached the end from the inside during this frame, as well as a state of continuously being located at the end since the previous frame. If it is determined that the position of area 53 after the movement has reached the end of freely movable region 54 (S106: YES), CPU 101 advances processing to step S107. If it is determined that the position has not reached the end of freely movable region 54 (S106: NO), CPU 101 advances processing to step S108.

In step S107, CPU 101 calculates a parameter that indicates a change of the appearance. In this example, the appearance to be changed is the shape and the display position of each virtual object. In a stationary state, each virtual object has a fixed shape. Further, in a stationary state, each virtual object is fixed at a predetermined position in virtual space 50. When the position of area 53 after the movement is out of freely movable region 54, in other words, when area 53 has reached the end of freely movable region 54, the shape and/or the display position of the virtual objects change from their stationary state. The details of the change of the appearance will be described below. There are two items of appearance to be changed, namely the shape and/or the display position of the virtual objects. For the sake of simplification of the description, the change of the shape and the change of the display position will be described separately.

Figure 7A:
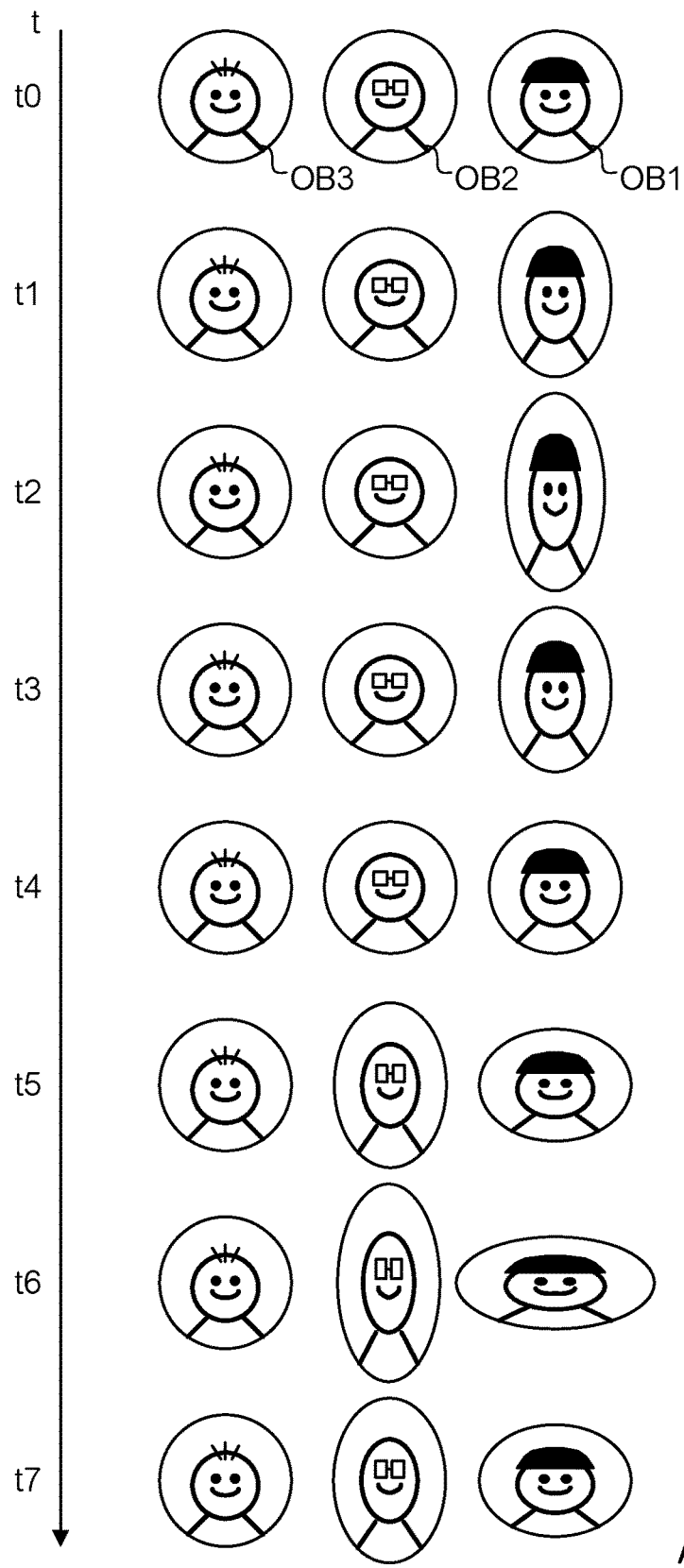
FIG. 7A shows a non-limiting exemplary change of the shape of the virtual objects.
Figure 7B:
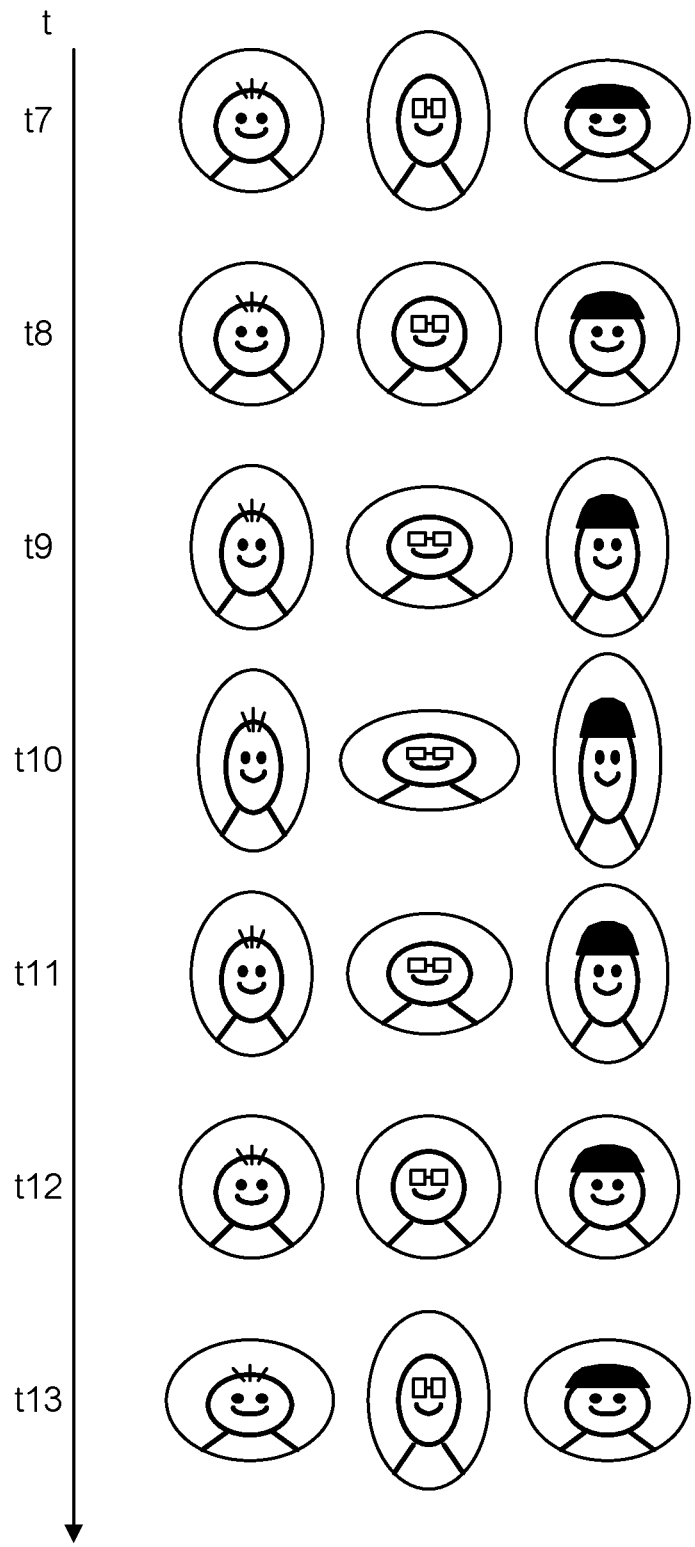
FIG. 7B shows a non-limiting exemplary change of the shape of the virtual objects.

FIGS. 7A and 7B are diagrams showing a non-limiting exemplary change of the shape of the virtual objects. In this example, the change of the appearance of three virtual objects, which are objects OB1, OB2, and OB3, is shown. These three virtual objects are virtual objects included in area 53. The vertical axis in FIGS. 7A and 7B indicates time, and the horizontal axis indicates the display position on the touch screen. In the following description, the direction in which objects OB1, OB2, and OB3 are arranged will be referred to as a "horizontal direction", and a direction perpendicular thereto will be referred to as a "vertical direction". Time t0 indicates a stationary state. Time t1 indicates the time immediately after the right side of area 53 reached the right end of freely movable region 54 after area 53 moved rightward within virtual space 50. Time t2 and subsequent times indicate the subsequent passage of time. Object OB1 is a virtual object that is located near an end of touch screen 202 when area 53 has reached an end of freely movable region 54.

First, at time t1, object OB1 starts to deform so as to extend in the vertical direction and contract in the horizontal direction. At time t2, the extension of object OB1 in the vertical direction reaches its maximum. In this example, a force that retains a certain shape (e.g., a circle) acts on each virtual object, based on a predetermined algorithm (e.g., an algorithm that is similar to that of surface tension). After time t3, object OB1 starts to deform so as to contract in the vertical direction and extend in the horizontal direction, based on this algorithm.

At time t5, the shape of object OB1 is extended horizontally, compared with its stationary state. In this example, two adjoining (neighbor) virtual objects (the nearest neighbor and the second nearest neighbor) deform depending on the shortest distance therebetween, based on a predetermined algorithm (e.g., an algorithm similar to that of a repulsive force acting between magnets facing on the same pole side). The shortest distance between the virtual objects is the distance between the portions of the outlines of the virtual objects at which they are closest to each other. After time t5, object OB2 starts to deform so as to extend in the vertical direction and contract in the horizontal direction based on this algorithm.

At time t5, object OB2 starts to deform so as to extend in the vertical direction and contract in the horizontal direction, compared with its stationary state. At time t6, the extension of object OB1 in the vertical direction reaches its maximum. After time t7, object OB2 starts to deform so as to contract in the vertical direction and extend in the horizontal direction.

At time t9, the shape of object OB2 is extended horizontally, compared with its stationary state. After time t9, object OB3 starts to deform so as to extend in the vertical direction and contract in the horizontal direction, based on the aforementioned algorithm. At time t10, the extension of object OB3 in the vertical direction reaches its maximum. After time t11, object OB3 starts to deform so as to contract in the vertical direction and extend in the horizontal direction. Note that object OB1 continues to deform even after object OB2 starts to deform, and object OB2 continues to deform even after object OB3 starts to deform. In this example, the change of the appearance is propagated in a direction parallel to the direction (leftward direction) of scrolling immediately before area 53 reaches the end of freely movable region 54 (in this example, is propagated in the same leftward direction).

Figure 8:
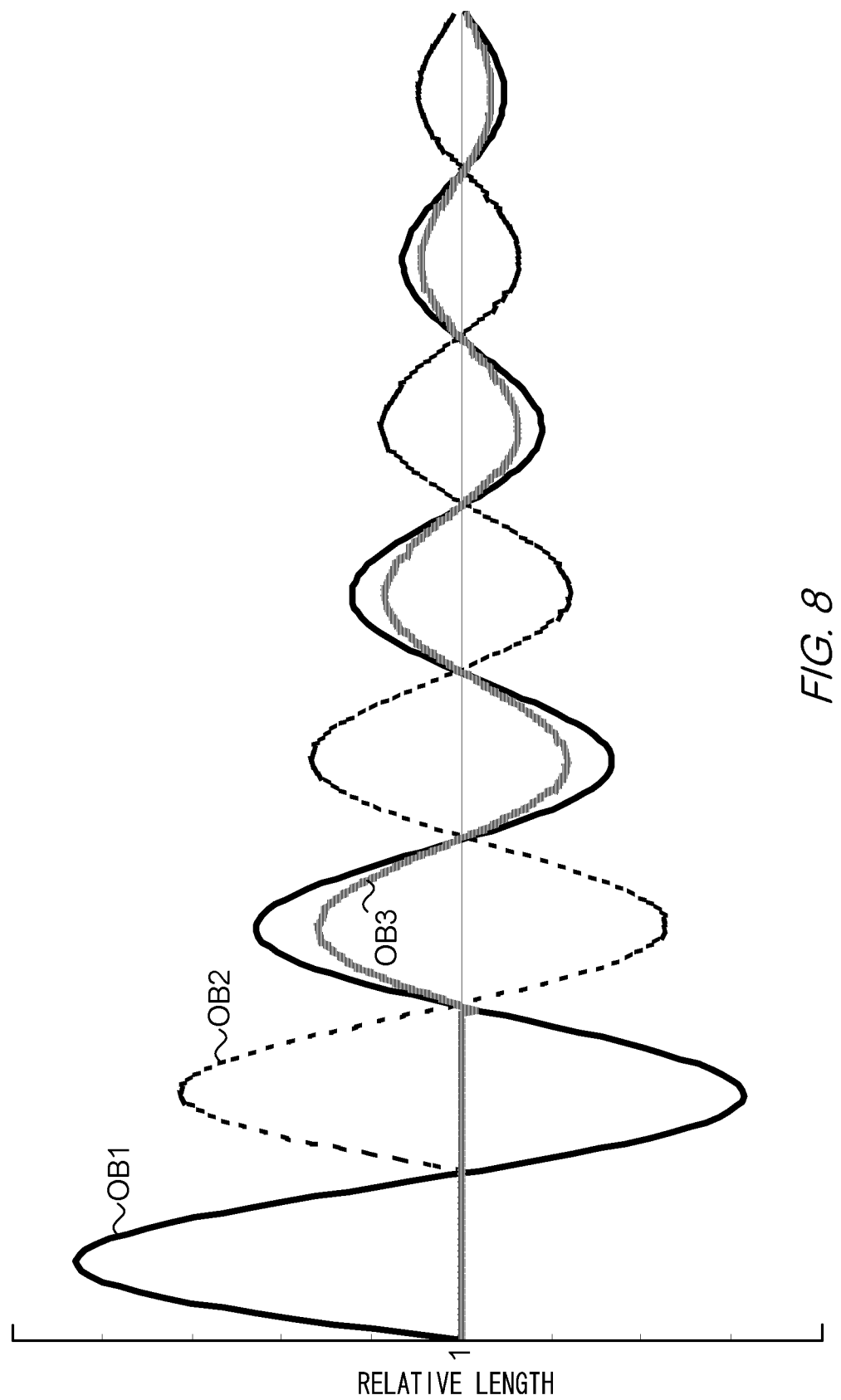
FIG. 8 shows a non-limiting exemplary change of parameters indicating the shape of the virtual objects.

FIG. 8 shows a non-limiting exemplary change of the parameters indicating the shape of the virtual objects. In FIG. 8, relative vertical lengths of virtual objects OB1, OB2, and OB3 based on their stationary states are shown as the parameters indicating the shape of the virtual objects. As shown in FIG. 8, each virtual object repeats extension and contraction. In the process of this repetition, the amplitude of the change of the relative lengths attenuates with a lapse of time. The amplitude of the change of the relative lengths also attenuates as the distance from the virtual object serving as a base point is longer. The change of the relative length of object OB2 is started at a time interval after the change of the relative length of object OB1 starts. The change of the relative length of object OB3 is started at a time interval after the change of the relative length of object OB2 starts.

Note that a description was given here for an example in which, among the virtual objects included in area 53, the virtual object that is closest to the end of freely movable region 54 (object OB1) is the base point of the change to be propagated. The virtual object to serve as the base point of the change is predetermined.

Figure 9A:
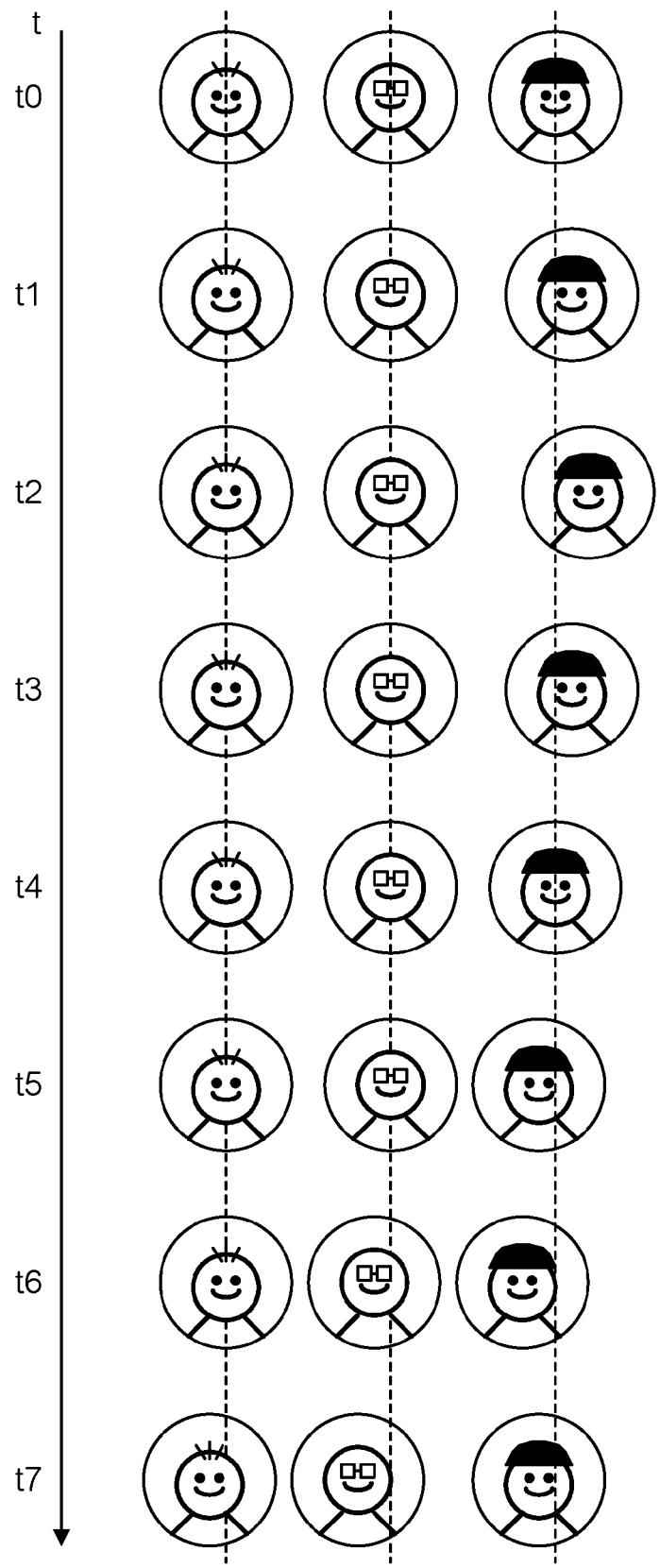
FIG. 9A shows a non-limiting exemplary displacement of the virtual objects.
Figure 9B:
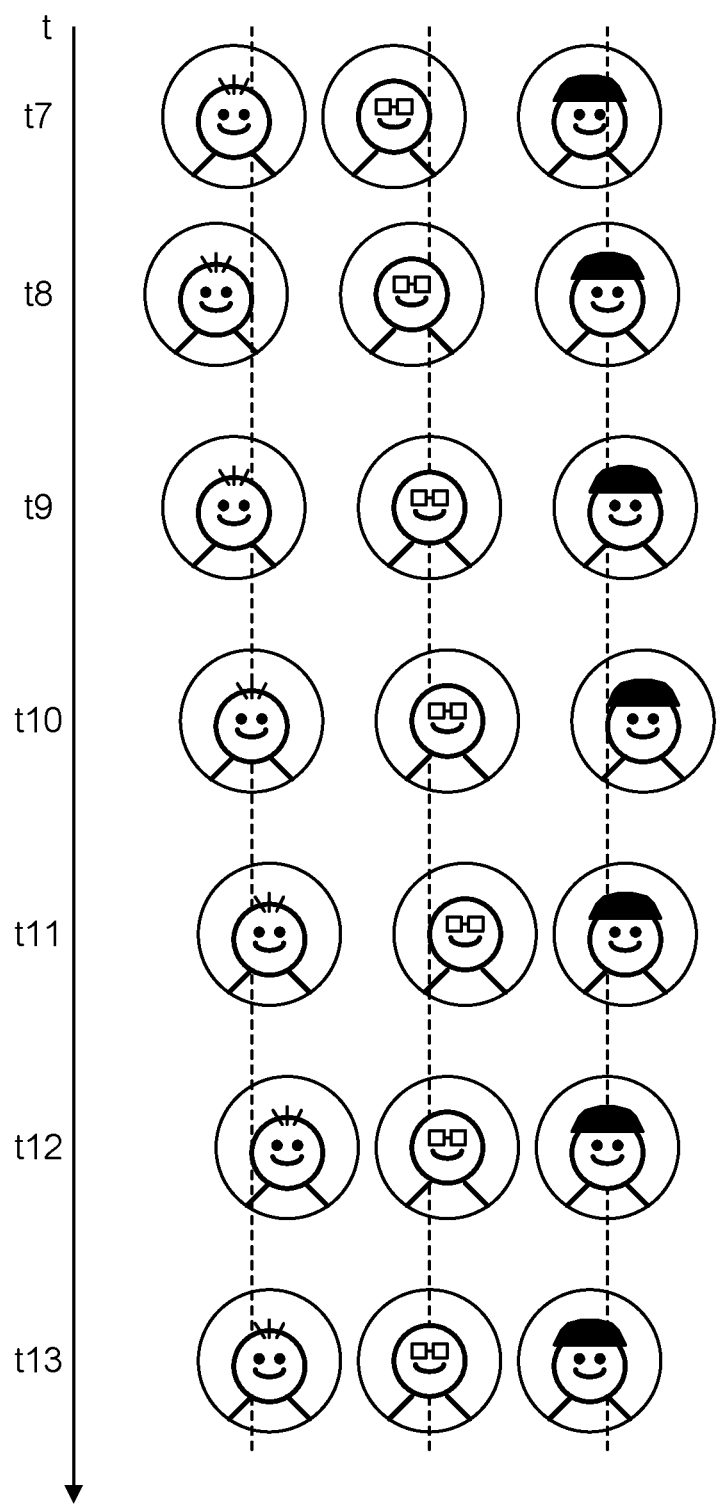
FIG. 9B shows a non-limiting exemplary displacement of the virtual objects.

FIGS. 9A and 9B show a non-limiting exemplary displacement of the virtual objects. The vertical axis in FIGS. 9A and 9B indicates time, and the horizontal axis indicates the display position on the touch screen. The time shown in FIGS. 9A and 9B is the same as the time shown in FIGS. 7A and 7B.

First, at time t1, object OB1 starts to be displaced rightward. At time t2, the amount of displacement of object OB1 reaches its maximum. In this example, a force that brings each virtual object back to its stationary position acts on the virtual object based on a predetermined algorithm (e.g., an algorithm with which a force similar to a spring acts, on the basis of the stationary position). After time t3, object OB1 starts to be displaced leftward based on this algorithm.

At time t5, the position of object OB1 is shifted leftward, compared with its stationary state. In this example, two adjoining virtual objects are displaced depending on the shortest distance therebetween, based on a predetermined algorithm (e.g., an algorithm similar to that of a repulsive force acting between magnets facing on the same pole side). The shortest distance between the virtual objects is the distance between the portions of the outlines of the virtual objects at which they are closest to each other. A repulsive force acts between object OB1 and object OB2 based on this algorithm, and after time t6, object OB2 starts to be displaced leftward.

At time t6, the position of object OB2 is shifted leftward, compared with its stationary state. A repulsive force acts between object OB2 and object OB3 based on the aforementioned algorithm, and after time t7, object OB3 starts to be displaced leftward. Note that object OB1 continues to be displaced even after object OB2 starts to be displaced, and object OB2 continues to be displaced even after object OB3 starts to be displaced. Thereafter, objects OB1, OB2, and OB3 are displaced in accordance with the aforementioned algorithm. In FIG. 9B, an exemplary displacement until time t13 is shown.

Figure 10:
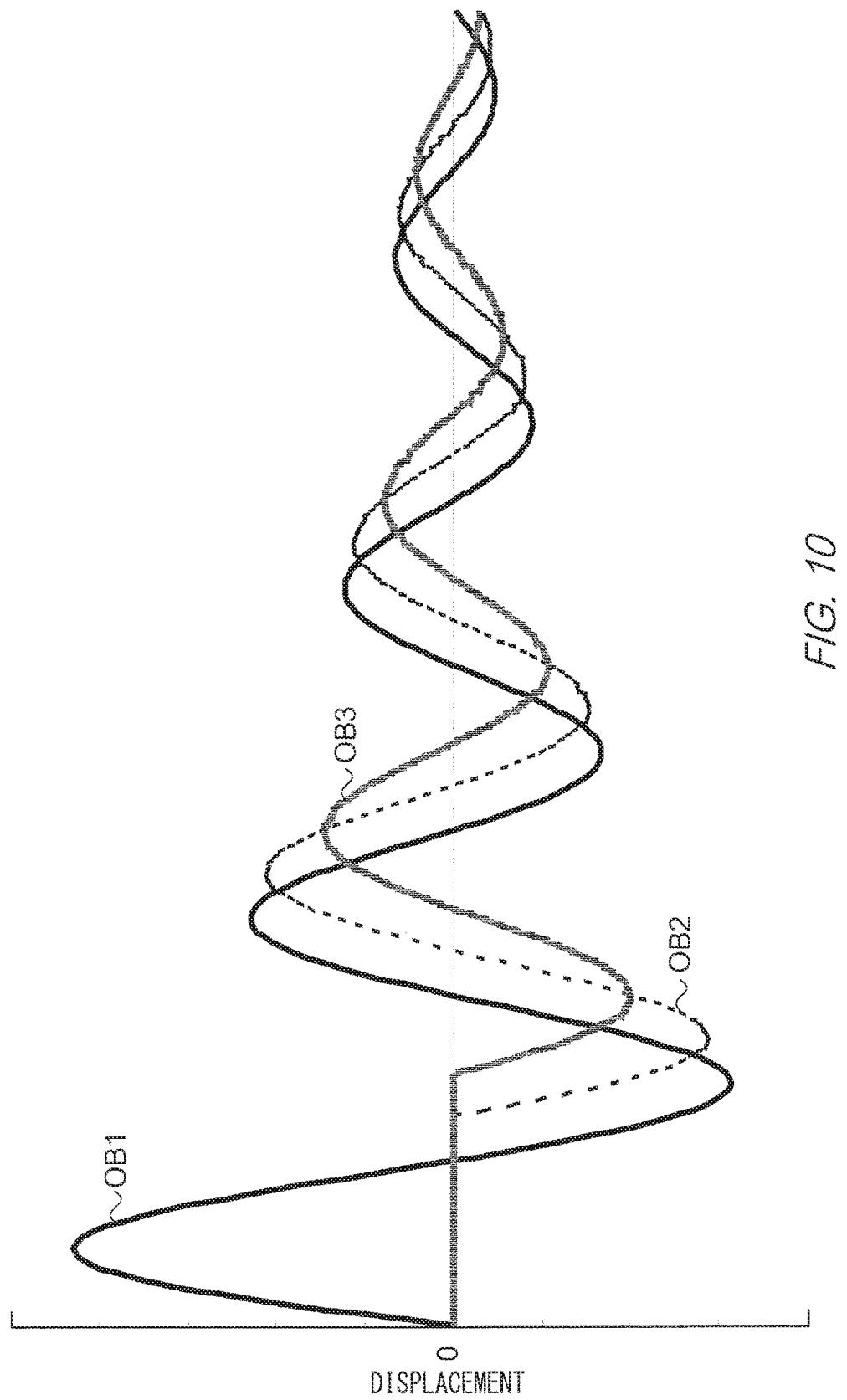
FIG. 10 shows a non-limiting exemplary temporal change of the displacement of the virtual objects.

FIG. 10 shows a non-limiting exemplary temporal change of the displacement of the virtual objects. In FIG. 10, the respective displacement of virtual objects OB1, OB2, and OB3 are shown. As shown in FIG. 10, each virtual object oscillates (reciprocates) in the vicinity of its stationary position. The amplitude of this oscillation attenuates with a lapse of time. The displacement of object OB2 is started at a time interval after the displacement of object OB1 starts. The displacement of object OB3 is started at a time interval after the displacement of object OB2 starts.

Now, refer to FIG. 6 again. In step S108, CPU 101 moves area 53 to the position calculated in step S105. Note that if the position after the movement calculated in step S105 has reached the end of freely movable region 54, CPU 101 stops area 53 such that area 53 does not go beyond the end of the freely movable region.

In step S109, CPU 101 causes the virtual objects included in area 53 to be displayed on touch screen 202 based on the position of area 53 and the parameters indicating the appearance of the virtual objects. Note that the flow in FIG. 6 is repeatedly executed in a predetermined cycle (e.g., in every frame)

Figure 11A:
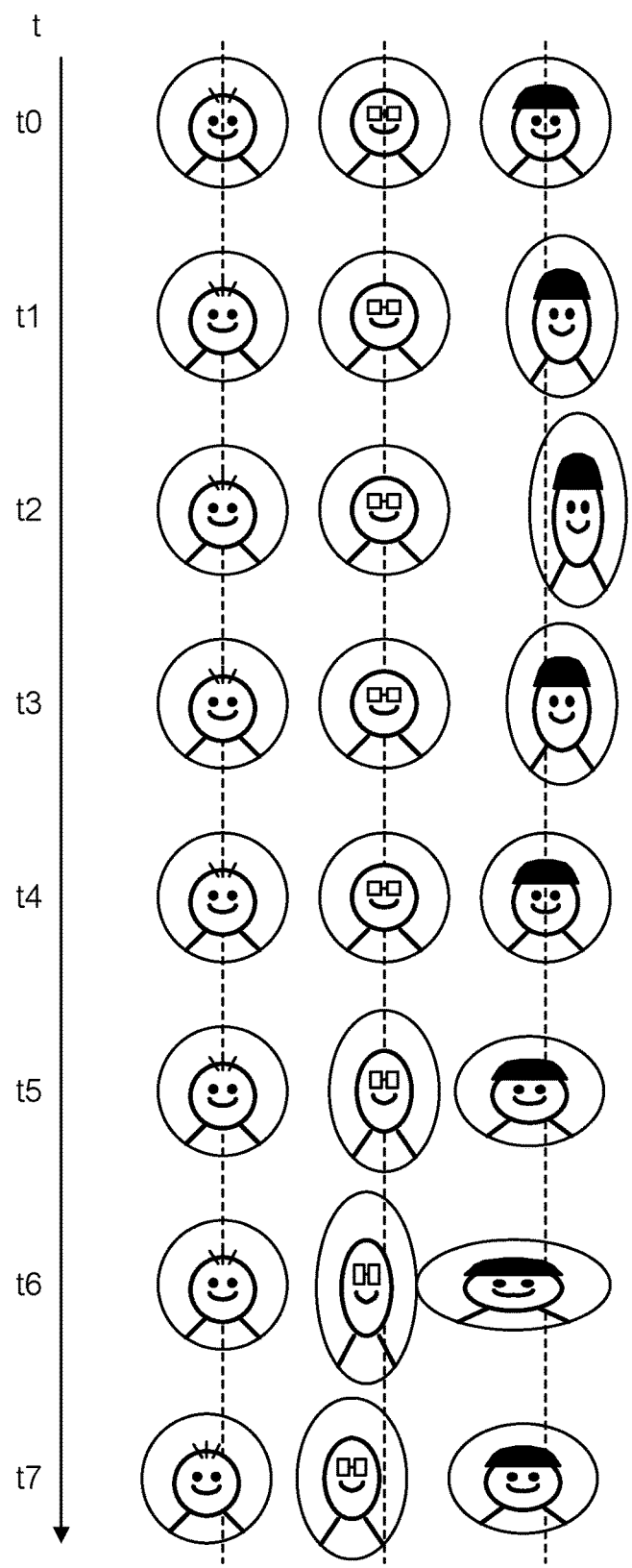
FIG. 11A shows a non-limiting more specific example of the change of appearance of the virtual objects.
Figure 11B:
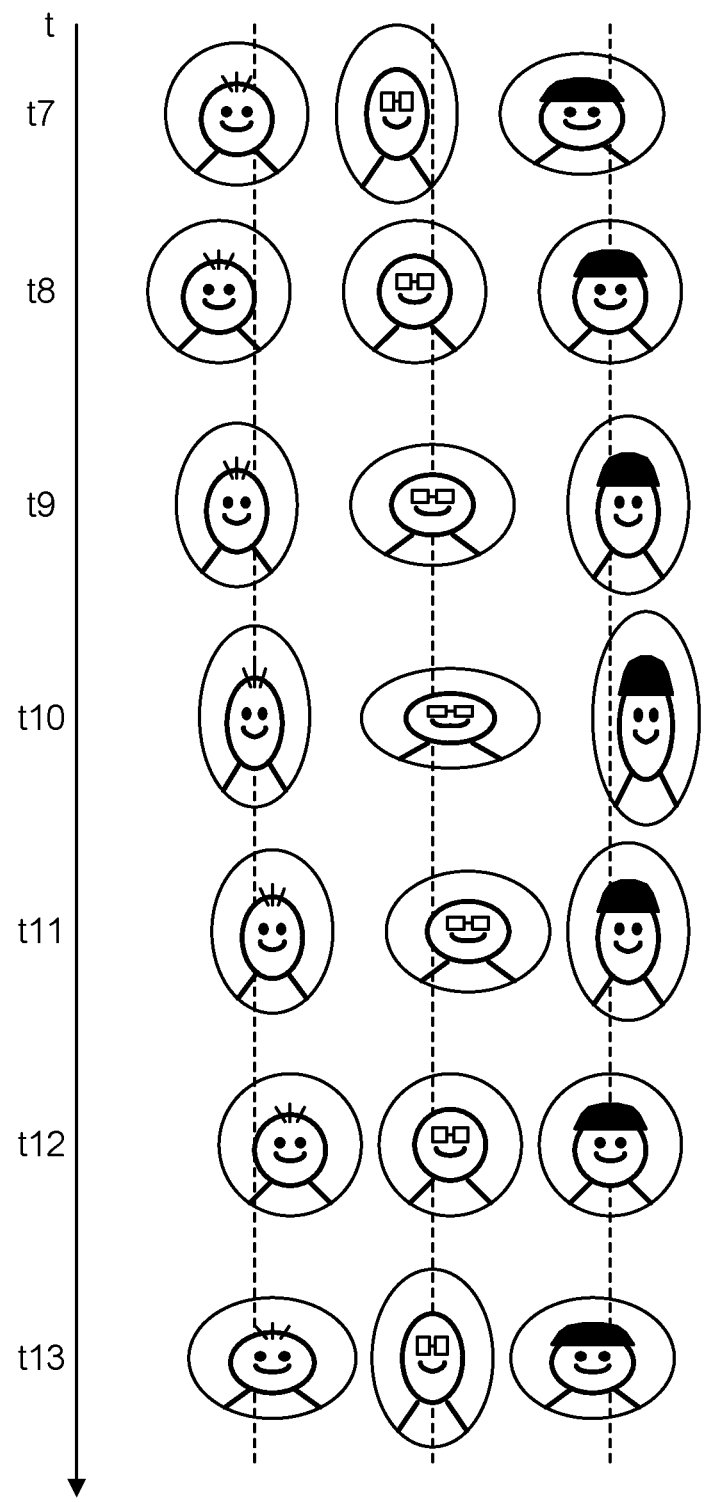
FIG. 11B shows a non-limiting more specific example of the change of the appearance of the virtual objects.

FIGS. 11A and 11B show a non-limiting more specific example of the change of the appearance of the virtual objects. The change of the shape and the displacement of the virtual objects were described separately thus far, but in this example, both the shape and the displacement change. According to this example, when the position of area 53 reaches the end of freely movable region 54, the virtual objects are provided with a change of the appearance (visual effect) with which the virtual objects shake like jelly. Note that in this example, the initial value of the parameter indicating the change of the appearance calculated in step S107 is a value which is zero with regard to both the deformation and the displacement. In other words, during the frame where area 53 reaches the end, the virtual objects appear to stop without deforming or being displaced, and their deformation and displacement start after the next frame. As a result, the user can recognize more instinctively that the position of area 53 has reached the end of freely movable region 54.

4. Modifications

The present disclosure is not limited to the above-described embodiment, and various modifications may be applied. Some modifications will be described below. Two or more of the following modifications may be combined.

4-1. Modification 1

Figure 12:
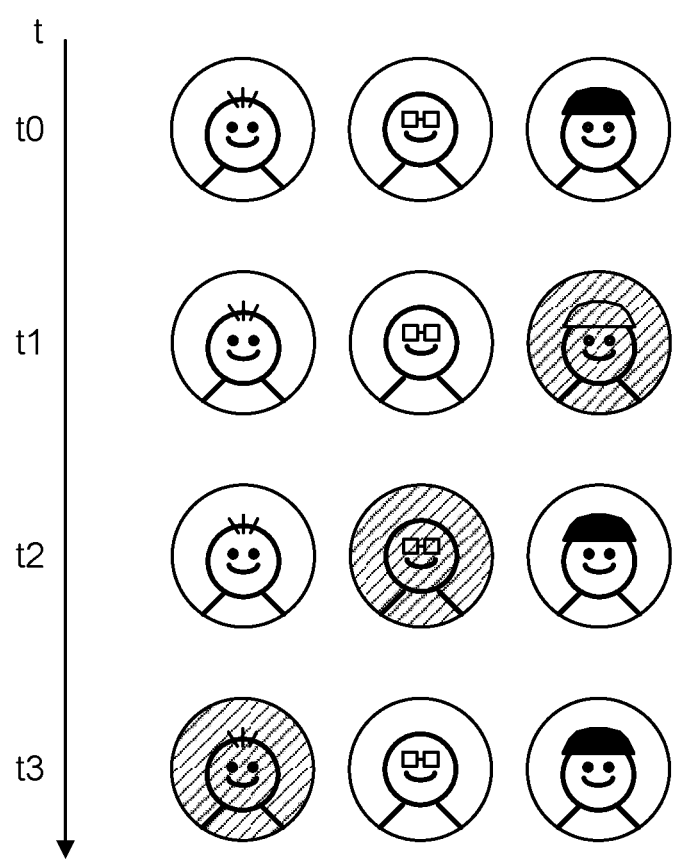
FIG. 12 shows a non-limiting exemplary change of the appearance according to Modification 1.

FIG. 12 shows a non-limiting exemplary change of the appearance according to Modification 1. The change of the appearance to be propagated is not limited to that described in the embodiment. FIG. 12 shows an example in which the change of the color of the virtual objects is propagated. The appearance to be changed other than this is also possible, and may be the shape, position, color, size, presence of decoration, flashing, animation processing, or a combination of two or more thereof. Note that although the phases of the shape change and of the displacement are the same in the example in FIGS. 11A and 11B, these phases do not necessarily have to be the same in a case where the changes of two or more appearance are combined.

Also in a case where the change of the appearance is the deformation of the virtual objects, the specific mode of deformation is not limited to the example described in the embodiment. Although the embodiment described an example in which the virtual objects deform in an anisotropic (vertically or horizontally elongated) manner, the virtual objects may be extended or contracted in an isotropic (analogue) manner.

4-2. Modification 2

Figure 13:
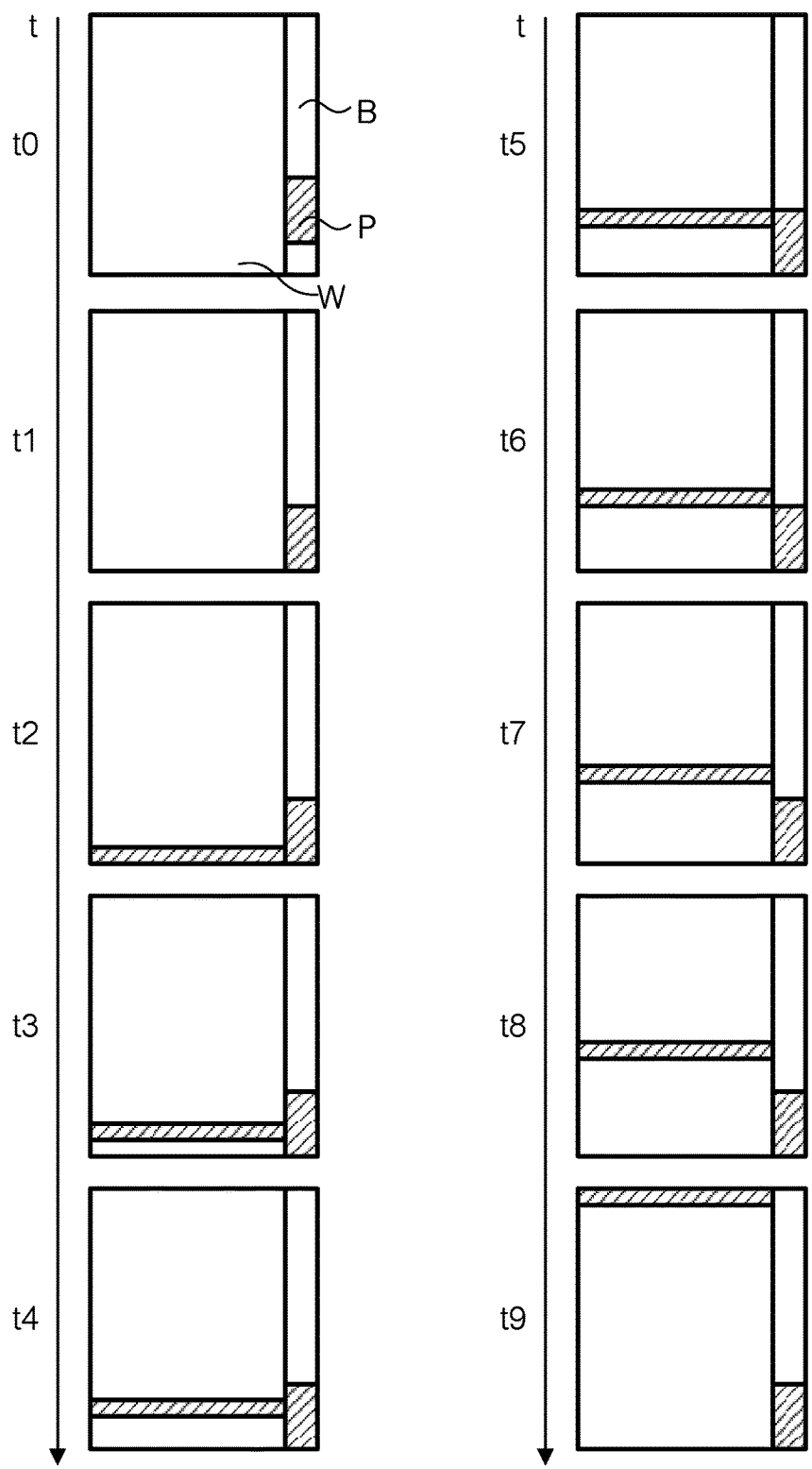
FIG. 13 shows a non-limiting exemplary change of the appearance according to Modification 2.

FIG. 13 shows a non-limiting exemplary change of the appearance according to Modification 2. The image to serve as the unit of propagation of the change of the appearance is not limited to the virtual objects. FIG. 13 shows an example in which the present technique is applied to an application program (e.g., a web browser) having window W in which an image to be scrolled is displayed. In this example, the change of the appearance is propagated in units of lines having a width of a predetermined value (e.g., one pixel). Note that a user interface of this application program has scroll bar B and pointer P, in addition to window W. A portion of the freely movable region that is being displayed on window W is indicated by the position of pointer P on scroll bar B.

In FIG. 13, time t0 indicates a stationary state. At time t1, the displayed area reaches the lower end of the freely movable region Immediately thereafter (time t2), the color of the line at the lowermost end of window W changes and is displayed in a color different from other part. This change of the displayed color is propagated (moves) from the lower end of window W toward the upper end thereof.

4-3. Modification 3

The direction in which the change of the appearance is propagated is not limited to the direction parallel to the scrolling direction. The change of the appearance may be propagated in a direction other than the scrolling direction (e.g., in the vertical direction). For example, in a case where virtual objects 52 are arranged two-dimensionally (in plural rows and columns) in virtual space 50, the change of the appearance may be propagated downward from above or upward from below when the image is scrolled rightward and the left end of area 53 reaches the left end of freely movable region 54. Alternatively, the change of the appearance may be propagated from the inside (e.g., the center) toward the periphery, or from the periphery toward the inside. The same applies to the case where the present technique is applied to images other than the virtual objects, as with Modification 2 (FIG. 13).

4-4. Modification 4

The image to serve as the base point of the change of the appearance is not limited to the example described in the embodiment. For example, the base point of the change of the appearance may be a virtual object other than the virtual object that is closest to an end of freely movable region 54, such as the virtual object that is located near the center of virtual space 50, the virtual object that is located farthest from the end of freely movable region 54, or the virtual object displayed at the end of, or near the center of, area 53. The same applies to the case where the present technique is applied to images other than the virtual objects, as with Modification 2 (FIG. 13).

4-5. Modification 5

Area 53 is not limited to an area that is part of the virtual space. Area 53 may be part of a real space.

4-6. Modification 6

The positional relationship between virtual object 52, area 53, and freely movable region 54 in virtual space 50 is not limited to that described in the embodiment. The embodiment described an example in which virtual objects 52 are fixed with respect to freely movable region 54, and area 53 moves within freely movable region 54. However, area 53 may be fixed with respect to freely movable region 54, and virtual objects 52 may move within freely movable region 54.

4-7. Other Modifications

Information processing device 1 is not limited to a video game console. Information processing device 1 may alternatively be a portable gaming device, or an information processing device other than a gaming device such as a personal computer, a mobile phone, a PDA (Personal Digital Assistants), or a tablet terminal. The application program executed in information processing device 1 is not limited to a game application. An application program for realizing a function other than a game, such as a document editing application, a learning application, or other practical software, may be executed in information processing device 1. Part of the functions of information processing device 1 described in the embodiment may be provided in a server device on the network. In this case, an information processing system including the server device and information-processing device 1 has the functions described in the embodiment.

The application program executed by information processing device 1 is not limited to that provided by a storage medium. The application program may alternatively be provided by download via a network such as the Internet. Further, system software of information processing device 1 may be provided by a storage medium or by download.

What is claimed is:

1. An information processing device comprising:
   a processing system that includes at least one hardware processor, the processing system configured to:
   output a plurality of images to a display screen for display thereon;
   responsive to reception of an input provided from a user, cause the plurality of images shown on the display screen to scroll;
   as a result of the plurality of images being scrolled to a predetermined end, visually change how at least one of the plurality of images is visually displayed on the display screen; and
   in accordance with the visual change in how the at least one of the plurality of images is visually displayed on the display screen, propagate, from the at least one of the plurality of images, the visual change to other images included in the plurality of images,
   wherein the propagation to other images in the plurality of images occurs sequentially through the plurality of images,
   wherein the visual change is at least one of a change in shape, color, size, presence of decoration, and flashing.

2. The information processing device according to claim 1, wherein the change is propagated in a direction parallel to a direction in which the plurality of images shown on the display screen are scrolled.

3. The information processing device according to claim 1, wherein the sequential change is in a predetermined direction from a predetermined image included in the plurality of images.

4. The information processing device according to claim 1, wherein the visual change is from: 1) an image at an end in the plurality of images towards another image located on the inside of the plurality of images, or 2) from an image in the plurality images that is located on the inside of the plurality of images towards an image at an end of the plurality of images.

5. The information processing device according to claim 1, wherein the processing system is further configured to:
   set a stationary position for each one of plurality of images as a result of the plurality of images reaching the predetermined end,
   wherein the visual change further comprises a visual displacement of a corresponding one of the plurality of images.

6. The information processing device according to claim 5, wherein the processing system is further configured to:

cause at least one of the images of the plurality of images to oscillate within a predetermined region including the stationary position.

7. The information processing device according to claim 5, wherein the displacement occurs in a direction parallel to a direction of how the plurality of images shown on the display are scrolled.

8. The information processing device according to claim 6, wherein the processing system is further configured to: attenuate amplitude of the oscillation with a lapse of time.

9. The information processing device according to claim 7, wherein the processing system is further configured to: attenuate amplitude of the oscillation in accordance with a distance of the propagation.

10. The information processing device according to claim 1, wherein the visual change includes a change that deforms the at least one image.

11. The information processing device according to claim 10, wherein the visual change that deforms the at least one image is an extension and/or contraction in a direction parallel to a direction of the scrolling of the plurality of images.

12. The information processing device according to claim 10, wherein the processing system is further configured to attenuate a degree of the deformation with a lapse of time.

13. The information processing device according to claim 10, wherein the processing system is further configured to attenuate a degree of the deformation in accordance with a distance of the propagation.

14. The information processing device according to claim 1, wherein
each one of the plurality of images is an image indicating a virtual object.

15. The information processing device according to claim 1, wherein the predetermined end is an end of a predetermined display area.

16. The information processing device according to claim 1, wherein the predetermined end is a display that includes the plurality shown images reaching an end of a predetermined movable region.

17. The information processing device according to claim 1, wherein, as part of the propagation, different images of the plurality of images are visually changed at different time periods.

18. A computer-readable non-transitory storage medium storing a program for causing a computer to execute a process, the process comprising:
causing an image group that includes a plurality of images to be displayed on a display screen;
responsive to reception of an input provided from a user, causing the displayed image group to scroll in accordance with the provided input;
visually changing how at least one image included in the image group is visually displayed on the display screen as a result of the image group reaching a predetermined end of the scrolling; and
propagating the visual change from one image included in the image group to another image included in the image group to thereby change how the another image is visually displayed,
where the visual change is propagated from the one image to another in the image group in a sequential manner,
wherein the visual change is at least one of a change in shape, color, size, presence of decoration, and flashing.

19. An information processing system comprising:
a display screen configured to diary an image group that includes a plurality of images:
a user input device configured to accept an input provided from a user that is to cause the image group to be scrolled;
at least one hardware processor configured to:
responsive to reception of the input provided from the user, scroll the plurality of images in accordance with the provided input,
determine that the scrolled plurality of images has reached a predetermined end for scrolling;
based on a result of the determination, visually change how at least one image included in the plurality images is visually shown on the display screen; and
in accordance with the visual change of the at least one images, propagate the visual change from one image included in the plurality of images to another one of the plurality of images so that the another one of the plurality of images is visual changed,
where the visual change is propagated through the plurality of images in a sequential manner so that each one of the images is visually changed in accordance with the propagation,
wherein the visual change is at least one of a change in shape, color, size, presence of decoration, and flashing.

20. An information processing method comprising:
causing an image group that includes a plurality of images to be displayed on a display screen;
responsive to reception of an input provided from a user, causing the displayed image group to scroll in accordance with the provided input;
visually changing how at least one image included in the image group is visually displayed on a display screen as a result of the image group reaching a predetermined end of the scrolling; and
propagating the visual change from one image included in the image group to another image included in the image group to thereby change how the another image is visually displayed,
where the visual change is propagated from the one image to another in the image group in a consecutive manner,
wherein the visual change is at least one of a change in shape, color, size, presence of decoration, and flashing.

* * * * *